United States Patent
Meersman et al.

(10) Patent No.: US 10,056,014 B2
(45) Date of Patent: Aug. 21, 2018

(54) POSITIONING AND ALIGNMENT DEVICE FOR TILED DISPLAYS

(71) Applicant: BARCO N.V., Kortrijk (BE)

(72) Inventors: Karim Meersman, Kortemark (BE); Bruno Devos, Olsene (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 15/113,690

(22) PCT Filed: Jan. 30, 2015

(86) PCT No.: PCT/EP2015/051884
§ 371 (c)(1),
(2) Date: Jul. 22, 2016

(87) PCT Pub. No.: WO2015/114072
PCT Pub. Date: Aug. 6, 2015

(65) Prior Publication Data
US 2017/0011669 A1   Jan. 12, 2017

(30) Foreign Application Priority Data

Feb. 3, 2014   (GB) .................................. 1401810.5

(51) Int. Cl.
*G09F 9/302* (2006.01)
*F16M 13/02* (2006.01)

(52) U.S. Cl.
CPC ........... *G09F 9/3026* (2013.01); *F16M 13/02* (2013.01)

(58) Field of Classification Search
CPC ......... E04F 13/00; E04F 13/07; E04F 13/072; E04F 13/08; E04F 13/0801; E04F 13/0803; E04F 13/0816; E04F 13/0819; E04F 13/0832; E04F 13/0839; E04F 13/0842;
(Continued)

(56) References Cited

U.S. PATENT DOCUMENTS 741,100 A * 10/1903 Blackman
4,497,125 A   2/1985 Hutchinson
(Continued)

FOREIGN PATENT DOCUMENTS

CN   202905058 U   4/2013

OTHER PUBLICATIONS

International Search Report (ISR) dated May 7, 2015, for PCT/EP2015/051884.
(Continued)

*Primary Examiner* — Jessica L Laux
(74) *Attorney, Agent, or Firm* — Bacon & Thomas, PLLC

(57) ABSTRACT

A positioning device and a fastening device to fix the relative position of two or more adjacent tiles on a tiled display and to provide alignment. Fixing the relative position of two adjacent display tiles will facilitate the alignment of tiles in tiled displays where the seam between tiles will be as regular as possible, thereby avoiding the introduction of misalignments and their associated visual artefacts. The positioning device allows linkage of it to at least two tiles of a tiled display. The display tiles are often rectangular in shape and the positioning device is then located at a corner of the tile. The positioning device can also be attached to a support structure to make a tiled display.

19 Claims, 10 Drawing Sheets

(58) Field of Classification Search
CPC .............. E04F 13/0848; E04F 13/0862; E04F 13/0871; E04F 13/09; G09F 9/3026
See application file for complete search history.

(56) References Cited

U.S. PATENT DOCUMENTS

| | | | | |
|---|---|---|---|---|
| 4,505,061 | A * | 3/1985 | Neuburger | H02B 15/04 40/489 |
| 6,823,640 | B1 * | 11/2004 | Pytlewski | E04F 15/02022 52/396.06 |
| 7,191,570 | B1 * | 3/2007 | Eaton | E04B 9/22 52/465 |
| 7,257,926 | B1 * | 8/2007 | Kirby | E04F 21/0092 33/526 |
| 8,384,616 | B2 | 2/2013 | Elliott et al. | |
| 8,720,143 | B2 * | 5/2014 | Noutsis | E04F 13/0832 33/533 |
| 9,297,397 | B2 * | 3/2016 | Peck | F16B 5/0685 |
| 2003/0016227 | A1 | 1/2003 | Matthies | |
| 2003/0056413 | A1 | 3/2003 | Wiemer et al. | |
| 2004/0179920 | A1 * | 9/2004 | Ando | F16B 33/006 411/501 |
| 2005/0083275 | A1 | 4/2005 | Wang et al. | |
| 2009/0310065 | A1 | 12/2009 | Dunn | |
| 2011/0179728 | A1 * | 7/2011 | Cerny | E01C 5/001 52/177 |
| 2014/0260041 | A1 * | 9/2014 | Peck | F16B 5/0685 52/489.1 |
| 2015/0059271 | A1 * | 3/2015 | Tsai | E04F 15/02194 52/302.1 |
| 2015/0345152 | A1 * | 12/2015 | Libreiro | E04F 13/0848 52/506.05 |

OTHER PUBLICATIONS

Written Opinion dated May 7, 2015, for PCT/EP2015/051884.
International Preliminary Report on Patentability (IPRP) dated May 11, 2016, for PCT/EP2015/051884.
Second Written Opinion dated Feb. 5, 2016, for PCT/EP2015/051884.
British Search Report dated Jul. 2, 2014, for GB 1401810.5.

* cited by examiner

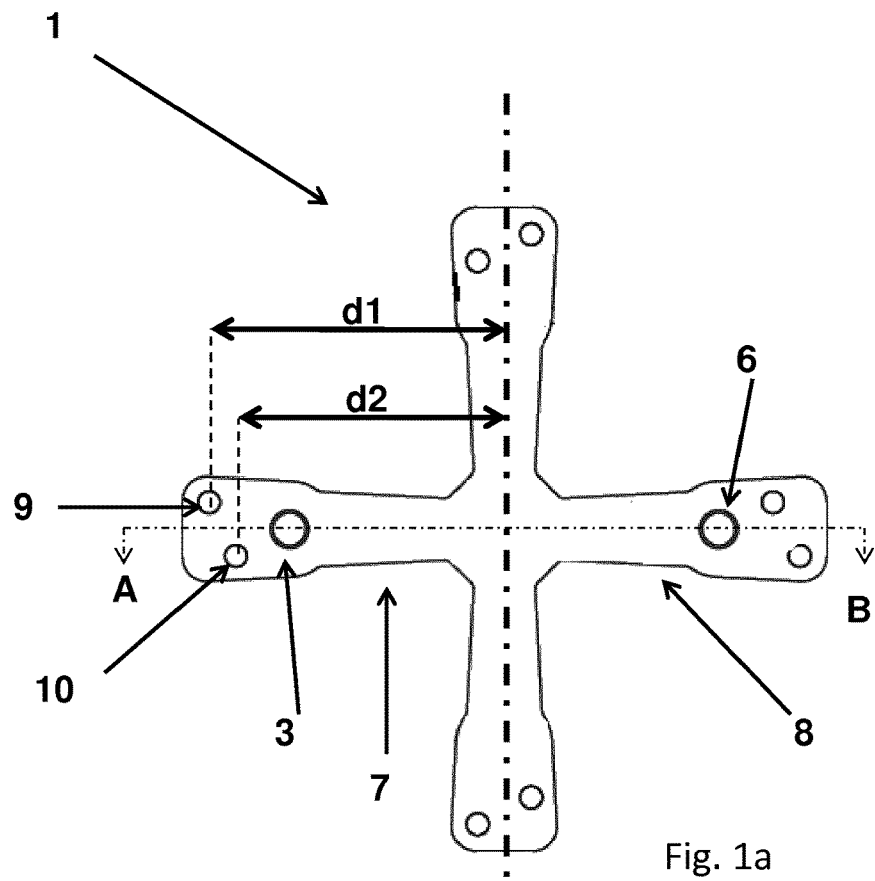
Fig. 1a
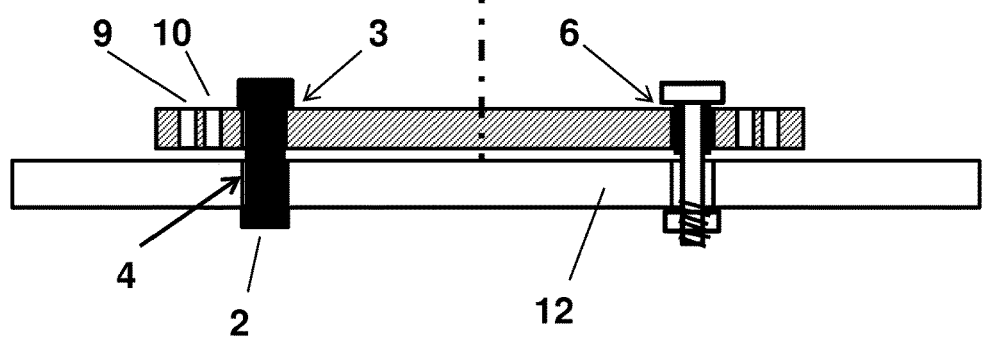
Fig. 1b
Fig. 1

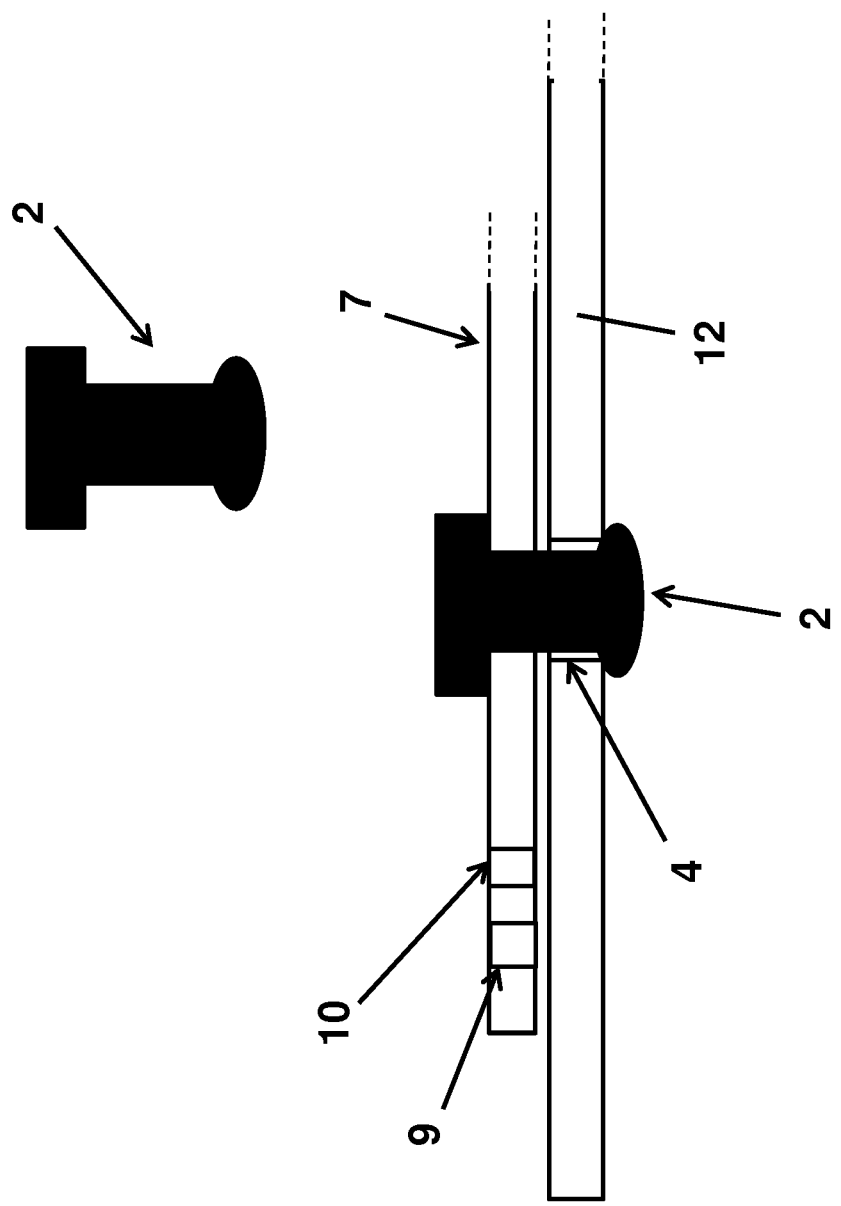

POSITIONING AND ALIGNMENT DEVICE FOR TILED DISPLAYS

The present invention pertains to the field of tiled displays and their installation and manufacture.

BACKGROUND

Large sized displays used at public functions such as football matches are made up of a number of part images displayed on tiles. Each individual image is displayed assuming that the tiles have a very specific geographic relationship with each other. This geographic relationship must be known and accurate so that the part images start and stop at the correct positions while allowing for spaces between the tiles. The problem of the alignment of the tiles in a tiled display is well known in the art. Alignment of the tiles is important to avoid introducing visual artefacts in the images displayed by the tiled display. Not only must tiles be parallel but the space between them, the seam, must have the same width throughout the tiled display.

The width of the seam may vary in function of the position on the tiled display because of e.g. tolerances in the dimensions of the profiles or beams that are assembled to form a support structure for the tiles of the tiled display.

Tiles can e.g. be fastened to the support structure by means of bolts and nuts. Tolerances on the position of the holes through which the bolts have to engage can also contribute to the variation of the seams.

It is possible, that the beams of the support structure may not be perfectly aligned which will have an impact on the alignment of the tiles. This will also contribute to variation of the width of the seam along a side of the same tile. While several solutions exist to align the tiles of a tiled display, they either require complex mechanical connections between tiles as in U.S. Pat. No. 8,384,616 B2 or are time consuming to install and adjust.

SUMMARY OF THE INVENTION

The inventors have determined that a solution is required that will not require complex additional hardware, that will allow compensating for the tolerances of a "run-of-the-mill" support structure with the desired precision and that, for example, can be applied to an existing support structure with a minimum of retrofitting.

An arrangement of two or more adjacent display tiles according to embodiments of the present invention are disclosed in claims 1 to 16, whereby each dependent claim is a separate embodiment of the present invention. A method of making an arrangement of two or more adjacent display tiles according to embodiments of the present invention is disclosed in claims 17 and 18. A positing and alignment device according to embodiments of the present invention are disclosed in claims 19 and 20, whereby each dependent claim is a separate embodiment of the present invention. A tiled display according to embodiments of the present invention is disclosed in claim 21.

In one aspect of the present invention a positioning device and a fastening means are used to fix the relative position of two or more adjacent tiles on a tiled display and to provide alignment. Fixing the relative position of two adjacent display tiles will facilitate the alignment of tiles in tiled displays where the seam between tiles will be as regular as possible, thereby avoiding the introduction of misalignments and their associated visual artefacts.

According to an aspect of the present invention, there is provided a positioning device with allows linkage of it to at least two tiles of a tiled display. The display tiles are often rectangular in shape and the positioning device is located at a corner of the tile.

Once linked, the positioning device and the at least two tiles will behave as a solid body i.e. the relative position of the tiles and the positioning device with respect to each other will be fixed.

When manipulated to e.g. assemble the tiles and form a tiled display, the positioning device can optionally deform elastically. The elastic deformation of the positioning device can modify the relative position of the one of the at least two tiles with respect to the other tile linked to the positioning device. To achieve this, the positioning device may be made of an elastic material such as a metal or a plastic.

The means to link the tiles to the positioning device can also be subject to play. The play can also be responsible for a change in the relative position of one or more of the at least two tiles with respect to the other tiles linked to the positioning device.

According to a further aspect of the invention, the material of the positioning device, the geometry of the positioning device, the material of the means to link the positioning device to the tiles and the geometry of those means are chosen to make the change in relative position of the tiles with respect to each other negligible when compared to the tolerances affecting the tiled display and that have to be compensated. In particular, the geometry and materials of the means to link at least two tiles to the positioning device are chosen to limit the change in relative position of the tiles linked to the positioning device to 10% of the tolerances affecting the tiled display or less than 10% of those tolerances.

According to a further aspect of the invention, a tile can be linked to the positioning device by at least one pin and opening combination or pair. The opening can be a blind or through hole. The pin can be referred to as a positioning pin. In one option the pin can be fastened to the tile. The pin engages in an opening in the positioning device that can be referred to as a positioning opening. The positioning opening can be a blind or through hole. A less preferred arrangement is when the pin is fixed on the positioning device and hole is in the tile.

The positioning device preferably has at least one positioning opening per tile which provides linkage to the positioning device.

When a single pin or pin and opening combination is used to link a tile to the positioning device, the angular position of the tile with respect to the positioning device is susceptible to vary largely during manipulation unless the friction between the positioning pin and the positioning opening is strong enough to prevent it. The friction that is required to keep the relative displacements of the tiles linked to the positioning device at or below 10% of the tolerances affecting the tiled display may have some drawbacks. For instance, engaging the positioning pin in the positioning opening or releasing the positioning pin can be difficult. This can affect the speed with which the tiled display is assembled as well as the productivity of those assembling the tiled display.

Therefore, according to a further aspect of the invention, a tile is linked to the positioning device by two or two pin and opening combinations, e.g. two positioning pins that engage in two positioning openings in the positioning device. In that case, the positioning device has two positioning openings per tile to be linked to the positioning device.

Linking a tile to a positioning device by means of two pi and opening combinations, e.g. two positioning pins engaging in two positioning openings is advantageous to limit the extent or amplitude of the rotation of a tile relative to the positioning device and the other tiles linked to the positioning device and keep the resulting change in relative positions at or below 10% of the tolerances affecting the tiled display while at the same time keeping the force required to engage a positioning pin in a positioning opening or releasing a positioning pin engaged in a positioning opening at a comfortable level. If the play of the two positioning pins of a tile in the positioning openings of the positioning device is negligible, one may in first approximation consider that the angular position of the tile with respect to the positioning device is fixed.

To further facilitate the correct alignment of the tiles and their fastening to the support structure, the positioning device can be fastened to the support structure by means of a fastening means. At least some of the tolerances to be compensated will require the position of the fastening means to be adjusted. The fastening means can be a second pin and opening combination or pair.

According to a further aspect of the invention, the fastening means for fastening the positioning device to the support structure can accommodate displacements of the tiles in the plane of the tiled display. The maximum amplitude of the displacements allowed by the fastening means is of the same order of magnitude as that of the tolerances to be compensated.

According to an aspect of the present invention, the fastening means is at least one fastener comprising an elastic material such as rubber for force fastening the positioning device to a support structure.

In a further aspect of the invention, the fastening means e.g. the rubber fastener is force fitted through an opening in the positioning device and an underlying opening in the support structure. A less preferred embodiment is that the positioning device has a pin comprising rubber that is attached to the positioning device and can be forced through an opening in the support structure. Also in a less preferred embodiment the support structure has a pin comprising rubber that is attached to the support structure and can be forced through an opening in the positioning device.

When a single fastening means e.g. a single rubber fastener is used to fasten the positioning device to the support structure, the amplitude of the rotation of the positioning device around the fastening means e.g. the rubber fastener is likely to be a problem (e.g. one may desire that the positioning device not only help align tiles with respect to each other but also, to some extent, with respect to the support structure). To that end, the positioning device can be fastened with the help of more than one fastening means e.g. rubber fasteners. Two fastening means e.g. two rubber fasteners to fasten the positioning device to the support structure appear to be a good compromise between compliance and precision.

In a further aspect of the invention, the positioning device may be shaped as a series of radiating arms, e.g. a cross with four arms. Other numbers of radiating arms can be used, e.g. with 8 arms.

Two diametrically opposed arms can each have a hole of the second pin and hole combination. The rein arms of the positioning device can have a hole of the first pin and hole combination.

BRIEF DESCRIPTION OF THE DRAWINGS

These and other features and advantages of embodiments of the present invention will now be described in more detail with reference to the accompanying drawings, in which:

FIG. 1a shows a top view of a cross shaped positioning device and FIG. 1b shows a section along the line A-B in accordance with an embodiment of the present invention.

FIG. 2b shows a cross section of the positioning device fastened to the support structure with another fastening means, i.e. another kind of rubber fastener in accordance with an embodiment of the present invention.

DETAILED DESCRIPTION OF THE INVENTION

Figure 2A:
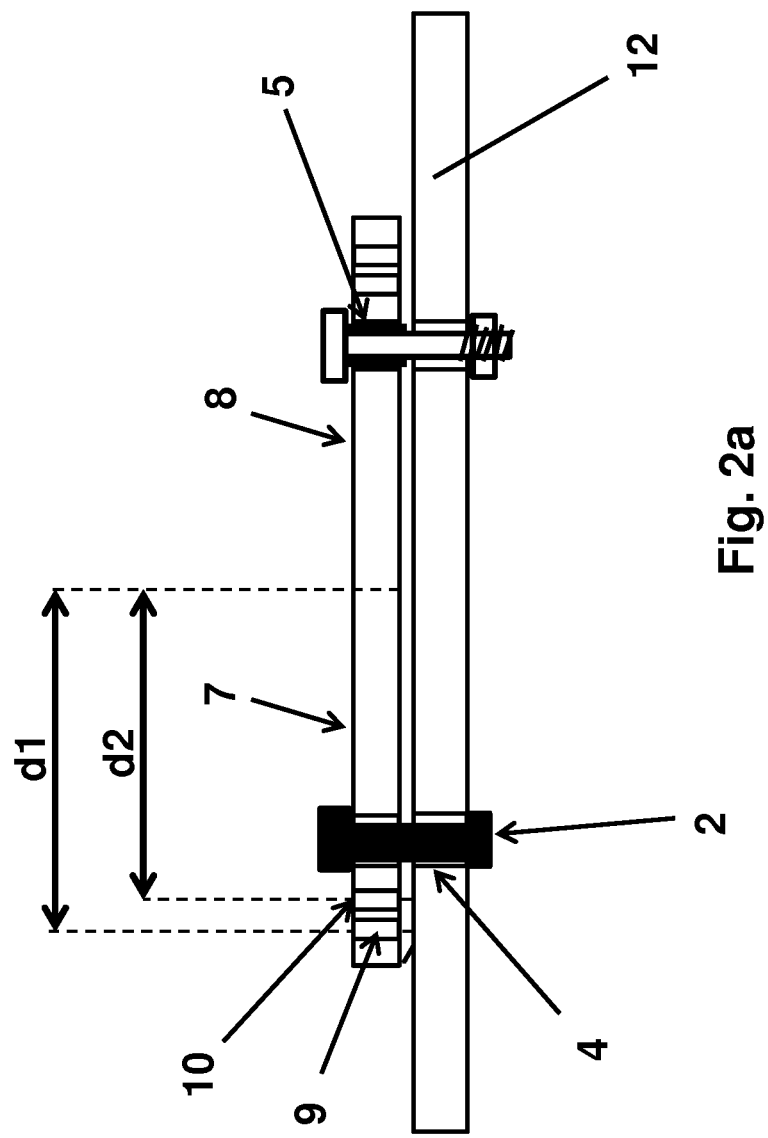
FIG. 2a shows a cross section of the positioning device fastened to the support structure with two different fastening means, I.e. rubber fasteners in accordance with an embodiment of the present invention.
Figure 3:
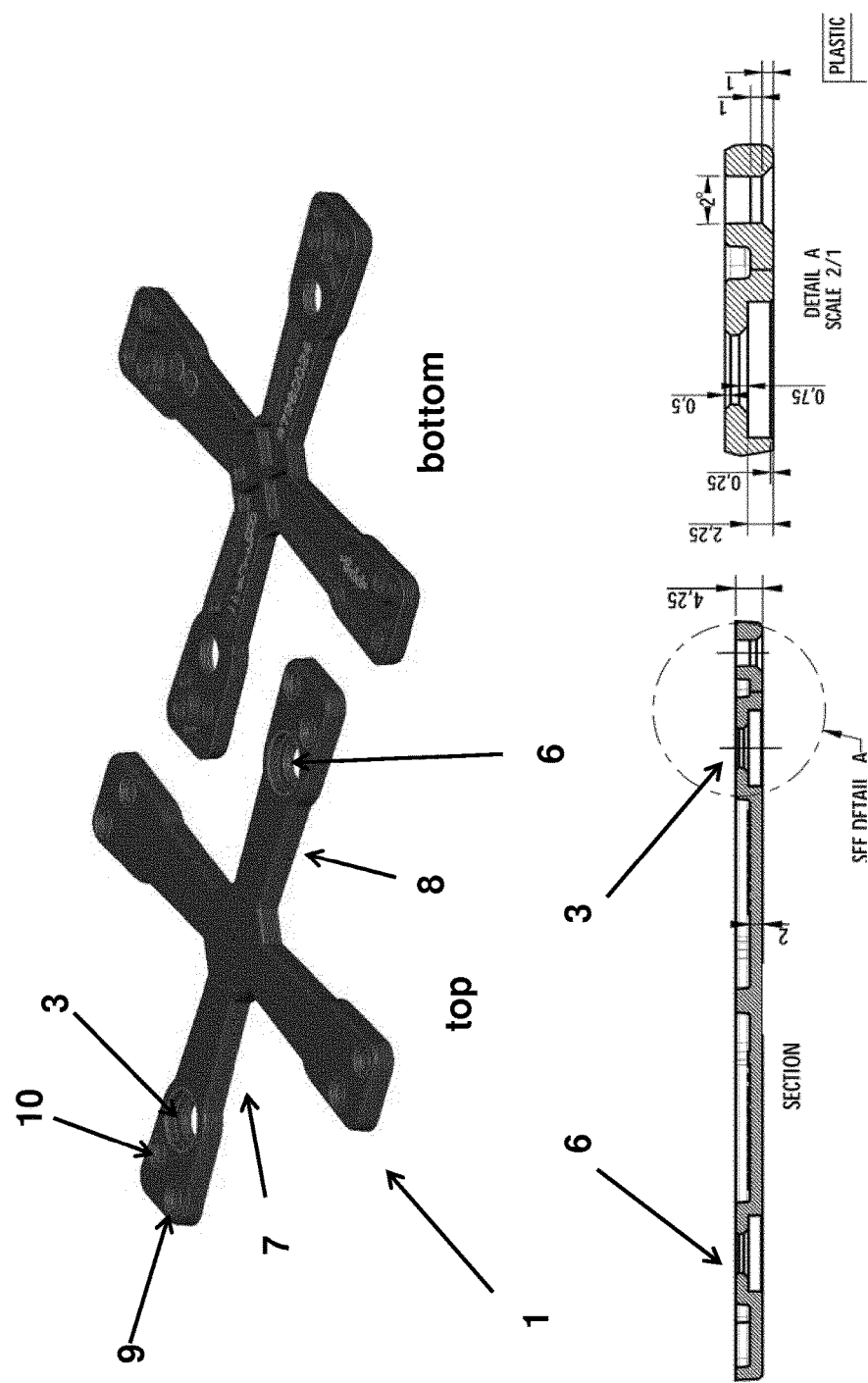
FIG. 3 shows details of the top and bottom of a positioning device with radiating arms, e.g. shaped as a cross in accordance with an embodiment of the present invention.
Figure 4:
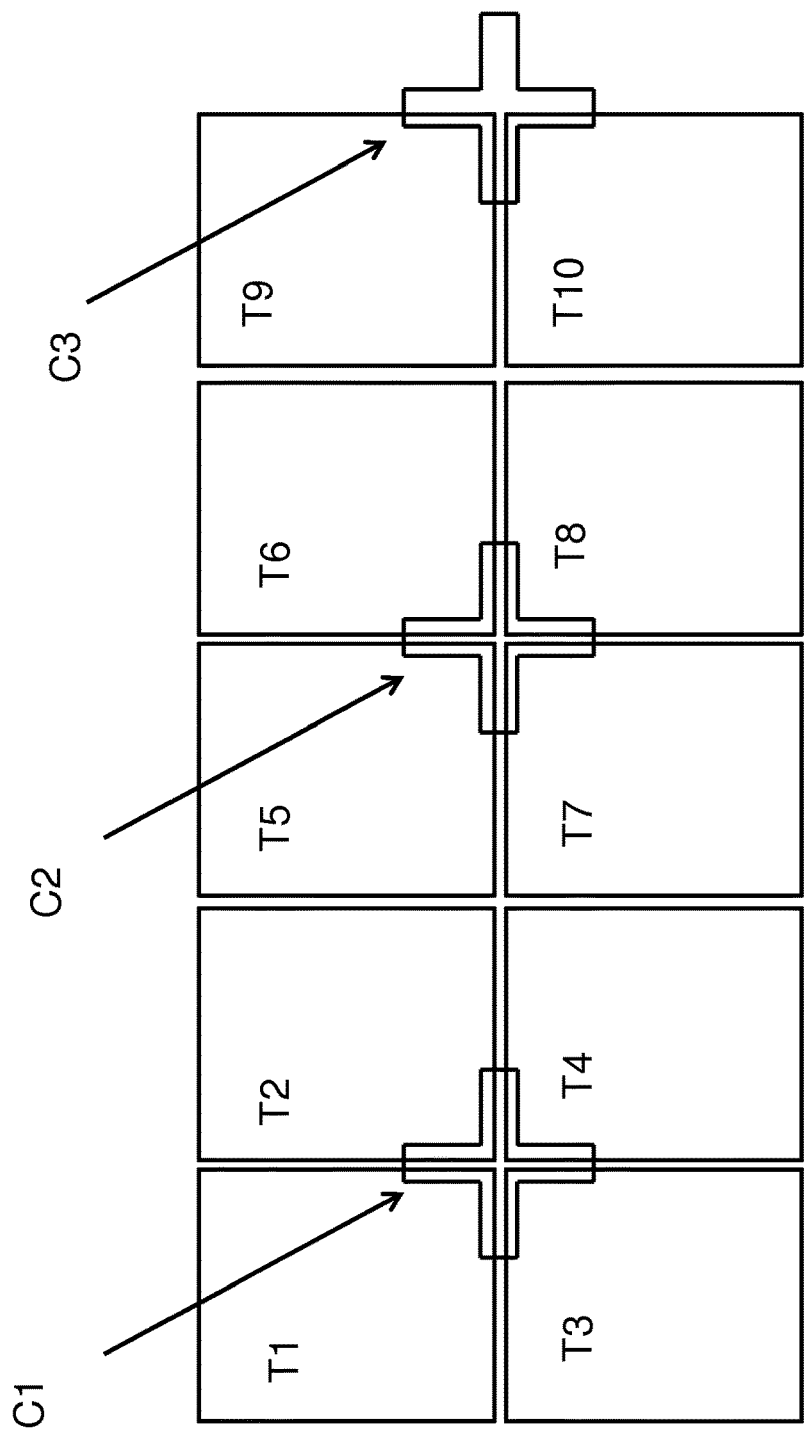
FIG. 4 shows an example of tiling with 2 rows of 5 tiles and the position of the positioning devices used to align the tiles in accordance with an embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated. The term "comprising", used in the claims, should not be interpreted as being restricted to the means listed thereafter; it does not exclude other elements or steps.

Furthermore, the terms first, second, third and the like in the description and in the claims, are used for distinguishing between similar elements and not necessarily for describing a sequential or chronological order. It is to b e understood that the terms so used are interchangeable under appropriate circumstances and that the embodiments of the invention described herein are capable of operation in other sequences than described or illustrated herein.

Moreover, the terms top, bottom, horizontal, vertical and the like in the description and the claims are used usually to describe a carpet that is laid horizontally unless another meaning is assigned to them.

In the drawings, like reference numerals indicate like features; and, a reference numeral appearing in more than one figure refers to the same element.

In the following embodiments will be described in which openings or holes are used to fasten structure together by means of fasteners such as pins or bolts. In all embodiments it is acceptable but often less preferred to reverse the positions of the openings and pins. In other words a mechanical inversion is possible in each case. Also it can be acceptable in any embodiment to use a fastener generally in the form of a rivet that passes through two holes. The term rivet includes elements comprising rubber which can have an enlarged head at each end which operate like the squashed heads of a rivet to lock the rubber rivet in place.

In a first embodiment, the positioning device has radiating arms such as four arms equally spaced in the form of a cross with means to attach it to a support structure and with means to link it to at least two tiles of the tiled display.

The means to attach the positioning device, e.g. cross to a support structure are preferably elastic enough to allow movement of the positioning device, e.g. cross within the plane of the tiled display when a force is exerted on the positioning device, e.g. the cross. By elastic enough is meant that the amplitude of the movement of the positioning device, e.g. cross will be of the same order of magnitude as the tolerance affecting the tile display and in particular the position of a tile on the tiled display and in particular the relative position of the tiles of the tile display. For instance, if the cumulated tolerances affecting the tiled display (e.g. tolerance for the dimensions of the element of the support structures, for the angles between element of the support structure, for the dimensions of the tiles, the position of means such as holes for fastening the elements of the support structure, position of means such as holes for attaching the positioning device, e.g. cross itself to the support structure . . . ) amount to up to 5 mm, then the amplitude of the elastic deformation of the means to attach the positioning device, e.g. cross to the support structure must be e.g. 5 mm or more when a force is exerted on the positioning device, e.g. cross within the plane of the tiled display. The amplitude of the force to cause a displacement of 5 mm or more is preferably the force that a field technician will be able to exert repeatedly throughout the assembly of the tiled display e.g. 100 N (Newtons) and preferably less than 100 N e.g. between 10 N and 50 N.

The positioning device, e.g. cross 1 on FIGS. 1*a* (top view) and 1*b* (section) is fastened to a support structure 12 by means of at least one fastening means such as rubber fastener 2 that is e.g. force fitted through an opening 3 in the positioning device, e.g. cross 1 and into an underlying opening 4 in the support structure 12 as seen on FIGS. 2*a* and *b*. Positioning is more precise when the positioning device, e.g. cross is fastened by two or more fastening means, e.g. rubber fasteners (2, 5) force fitted through openings 3 and 6 in the positioning device, e.g. cross 1. Two fastening means, e.g. rubber fasteners to fasten the positioning device, e.g. cross 1 to the support structure 12 appear to be a good compromise between ease of use and precision. A single fastening means, e.g. a single fastener still allow rotation of the positioning device, e.g. cross in the plane of the tiled display whereas more than two fastening means, e.g. fasteners impose additional constraints on the movement of the positioning device, e.g. cross within the plane of the tiled display. In a particular embodiment, the two openings 3 and 6 within which the two alignment and fastening means, e.g. rubber fasteners 2 and 3 will be force fitted; are spaced apart on a line passing through the center of the positioning device, e.g. cross 1. In accordance with an embodiment a first opening 3 can be positioned close to the extremity of a first arm 7 of the cross 1 and a second opening 6 can be positioned close to the extremity of a second arm 8 of the cross 1. The first arm 7 and the second arm 8 occupy symmetrical positions with respect to the center of the cross 1.

The rubber fasteners can be rubber sleeves enveloping a bolt or screw or can be capped rubber cylinders with a diameter slightly larger than the diameter of the openings 3 and 6 and 2 and 4 so that they can be force fitted not only into opening 3 and 6 but also into the openings 2 and 4. Alternatively, the rubber fasteners have a more complex geometry as seen on FIG. 2*b*. The fastener of FIG. 2*b* is to be forced through the openings 3 and 4 which is possible thanks to the properties of rubber. Once the "head" of the fastener has passed through the opening 4, it recovers its shape which will prevent the rubber fastener from disengaging from the opening 4. In FIG. 2*a* the rubber fastener 2 is represented as a capped rubber cylinder and the rubber fastener 5 is represented as a bolt in a rubber sleeve. Other elastic fasteners are possible as long as they allow the positioning device, e.g. the cross 1 to be displaced within the plane of the tiled display with the amplitude of the movement of the same order of magnitude as the tolerances affecting the relative position of two adjacent display tiles.

Each arm of the positioning device, e.g. cross 1 has two positioning openings (e.g. 9 and 10 on arm 7). The positioning openings such as 9 and 10 are positioned at the extremities of the arms. The two positioning openings on the same arm can be at different distances d1 and d2 from the center of the cross but this is not compulsory. The two positioning openings on one arm (e.g. 9 and 10 on arm 7) and the center of the cross are not collinear. The two positioning openings on one arm (e.g. 9 and 10 on arm 7) are preferably located at positions that are either side of a line passing through the centre of openings 3 and 6. Openings 3 and 6 will be located finally in the region of the seam between two tiles whereas openings 9 and 10 will be opposite tiles.

The position of the positioning openings on the arms of the postioning device, e.g. the cross is advantageously the same on each arm of the cross.

Positioning pins on the tiles of the tiled display can engage in the positioning openings of the cross. For cylindrical positioning openings and cylindrical positioning pins, the diameter of the positioning pins is typically slightly smaller, e.g. one hundredth mm smaller than the diameter of the positioning openings. For each tile, two positioning pins will preferably engage in two positioning openings of at least one positioning device, e.g. cross (more generally, there can be twice as many positioning pins on a tile than there are positioning devices such as crosses to be used with that tile, i.e. each tile has at least two positioning pins per positioning device, e.g. cross. More generally, there can be more than two positioning pins to link one tile to a given positioning device, e.g. cross).

Referring to FIGS. 4 to 9, when the positioning pins of two tiles e.g. T1 and T2 are engaged in the positioning openings of the same positioning device, e.g. cross C1 fastened to a support structure 12 (i.e. with the support structure limiting the transversal movements of the tiles and the cross), the relative position of the tiles T1 and T2 is fixed. In particular, each tile T1 and T2 being linked to the cross C1 by two positioning pins, the relative angular position of the tiles with respect to each other and the positioning device, e.g. cross is fixed.

By fixed is meant that displacements of T2 (linear and angular) with respect to T1 will be limited by the mechanical properties of the positioning device, e.g. cross (i.e. the material of the cross, the geometry of the cross like the length of the arms, their width and thickness . . . ) and the play of the positioning pins in the positioning openings. This will be the case for e.g. a cross in PPS plastic having the dimensions of, for example there are four arms at 90° to each other as shown in FIG. 1 with an arm length of 60 mm, an arm width of 19-20 mm, and arm thickness of 4 to 5 mm. For instance when the geometry of the positioning device, e.g. cross is as above and the tiles are rectangular, the tiles T1 and T2 will be substantially parallel to each other (in other words the sides of T1 will be parallel to the corresponding sides of T2) and the distance between the tiles T1 and T2 will be substantially determined by the dimensions of the positioning device, e.g. the cross C1. The material and geometry of the cross are chosen such that the deformation of the cross and the play of the positioning pins in the positioning openings will be negligible in comparison to the displacement allowed by the rubber fasteners (e.g. the relative displacement of the tile T1 with respect to the tile T2 caused by elastic deformation of the positioning device, e.g. the cross and the play of the positioning pins in the positioning openings is less than 10% of the displacement allowed by the rubber fasteners and preferably less than 1% of the displacement allowed by the rubber fasteners).

The positioning device, such as cross C1 thus simplifies the positioning and alignment of two adjacent tiles T1 and T2 when the tiled display is being assembled. Hence, in accordance with any of the embodiments of the present invention, the positioning device and the first and second fastening means provide a positioning, alignment and fastening arrangement for display tiles to be positioned and aligned.

Assuming that the support structure that will support the tiles of the tiled display has already been erected and that positioning devices such as the crosses have already been fastened to the support structure, assembly of the tiled display starts by positioning a first tile T1.

The positioning pins of the tile T1 are engaged in the positioning holes of at least one positioning device such as cross C1 allowing a first positioning of the tile T1 close to the desired final position for the tile T1. The fastening means used to fasten a tile to the support structure are prepared e.g. screws, washers and bolts are positioned but still allow movement of the tile T1 thanks to the clearance between the screws and the opening through which they are positioned.

The tile T1 can be moved within the plane of the tiled display to compensate for the tolerances of the structure and the tile itself. The amplitude of the displacements of the tile T1 are limited by the rubber fasteners of the positioning device such as cross C1. An operator can thus displace the tile T1 without the risk of moving it too far from the original position (which is expected to be close to the ideal position for tile T1). There being two rubber fasteners, rotation of the tile T1 is also limited which further facilitates alignment of the tile T1 with the support structure or with the local vertical direction.

Once the position of the tile T1 has been adjusted, the permanent fastening means are tightened to hold the tile T1 in that position. The permanent fastening can be obtained by tightening the screws, washers and bolts mentioned above.

Assembly of the tiled display proceeds by placing a second tile T2 next to the first tile T1. Two of the positioning pins of the tile T2 are engaged in the corresponding positioning openings of the positioning device such as cross C1. This determines the relative position of the tile T2 (e.g. the corresponding sides of the tiles T1 and T2 are parallel and the distance between the tiles T1 and T2 is determined) with respect to the tile T1 and the positioning device such as cross C1.

The permanent fastening means for tile T2 are tightened, e.g. the screws, washers and bolts.

Assembly of the tiled display proceeds by engaging two of the positioning pins of a tile T3 in corresponding positioning openings of the positioning device such as cross C1. This determines the relative position of the tile T3 with respect to the positioning device such as cross C1 and the tiles T1 and T2.

Assembly of the tiled display proceeds by engaging two of the positioning pins of a tile T4 in corresponding positioning openings of the cross C1. This determines the relative position of the tile T4 with respect to the cross C1 and the tiles T1, T2 and T3.

When the tiled display has more than four tiles, the tiling can be done by group of four tiles or less. For instance, for a tiled display with 5 by 2 tiles as seen on FIG. 4, a first positioning device such as cross C1 can be used for a first group of 4 tiles (T1, T2, T3, T4), a second positioning device such as cross C2 with a second group of four tiles (T5, T6, T7, T8) and a third positioning device such as cross C3 with a third group of two tiles (T9, T10). In that case, the first tile of the second group will have to be aligned with the first group of four tiles without the help of the positioning device such as the cross, the positioning device such as the second cross being used to align the tile of the second group with respect to each other. In a particular embodiment, the positioning device such as cross C3 can be reduced to a T-shaped element T3. Such a T-shaped positioning and adjustment means is a particular embodiment of the positioning device such as a cross to align two elements (e.g. at the borders of a tiling).

Figure 5:
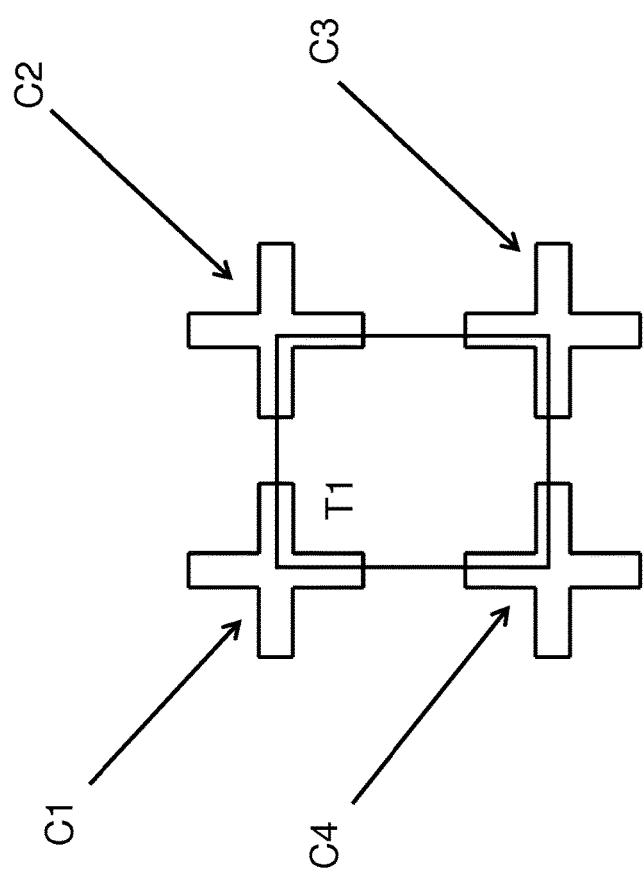
FIG. 5 to FIG. 9 illustrates a method to align the tiles of a 3 by 4 tiled display in accordance with an embodiment of the present invention.

Alternatively, the positioning pins of the first tile T1 can be engaged in the positioning openings of more than one positioning device such as the cross as seen on FIG. 5 where the positioning pins of T1 are engaged in positioning openings of four positioning device such as the crosses (C1, C2, C3 and C4).

The tolerance that would exist between the spacing of positioning pins on the tile and the positioning openings on different positioning devices such as the crosses is compensated by the displacement of the positioning device such as the crosses allowed by the rubber fasteners.

FIGS. 5 to 9 give an example of a tiled display with 3 by 4 tiles (i.e. 3 rows of 4 tiles). A first tile T1 is positioned on the support structure, the positioning pins of T1 engaging with the positioning openings of the positioning device such as the crosses C1, C2, C3 and C4 (see FIG. 5).

The position of the tile T1 can be adjusted before the permanent fastening means are tightened, e.g. the screws, washers and bolts as mentioned above.

Figure 6:
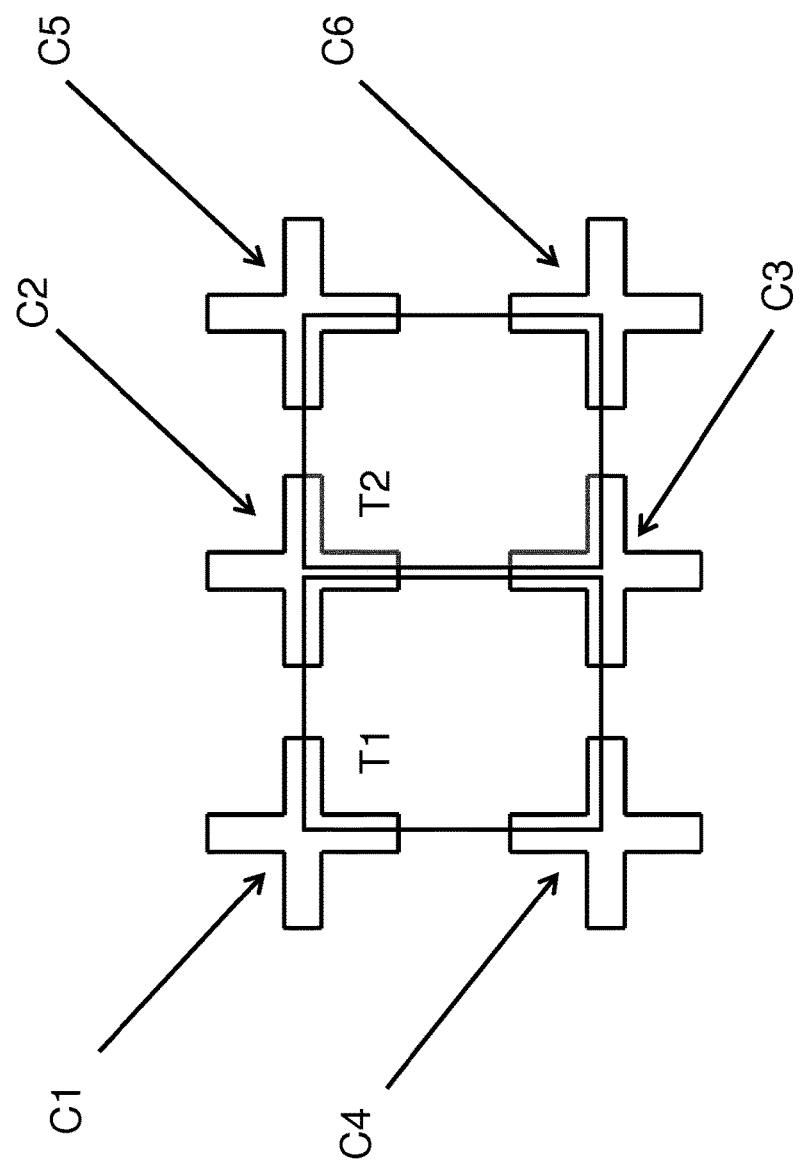

Assembly of the tiled display proceeds by placing a second tile T2 next to the first tile T1. Two of the positioning pins of the tile T2 are engaged in the corresponding positioning openings of the positioning device such as the cross C2. In the example of FIG. 6, three other groups of two positioning pins of T2 will engage in the positioning openings of the positioning device such as the crosses C3, C5 and C6. The tile T1 being fastened to the support structure with fastening means less compliant than the rubber fastener of the positioning devices such as the crosses, the crosses C5 and C6 that will move will in a first approximation be the only one to move (e.g. if the distance between the positioning openings in positioning devices such as the crosses C2 and C5 in is smaller than the distance between the corresponding positioning pins on T2, the positioning devices such as the crosses C5 and C6 will move in direction of the tile T1).

Once at least two positioning pins of the tile T2 are engaged in the two corresponding openings of the positioning device such as the cross C2 (as on FIG. 6), the movements or the tile T2 in the plane of the tiled display will be limited. The tiles T1 and T2 being linked by the positioning device such as the cross C2, they will behave in a first approximation as a solid body for movements in the plane of the tiled display. This means that if the tile T1 is moved in the plane of the tiled display, the tile T2 and at least the positioning device such as the cross C2 will move with the tile T1 as if T1, T2 were a solid body. This means that in a first approximation, the position and orientation of the tile T2 with respect to the tile T1 is fixed.

Figure 7:
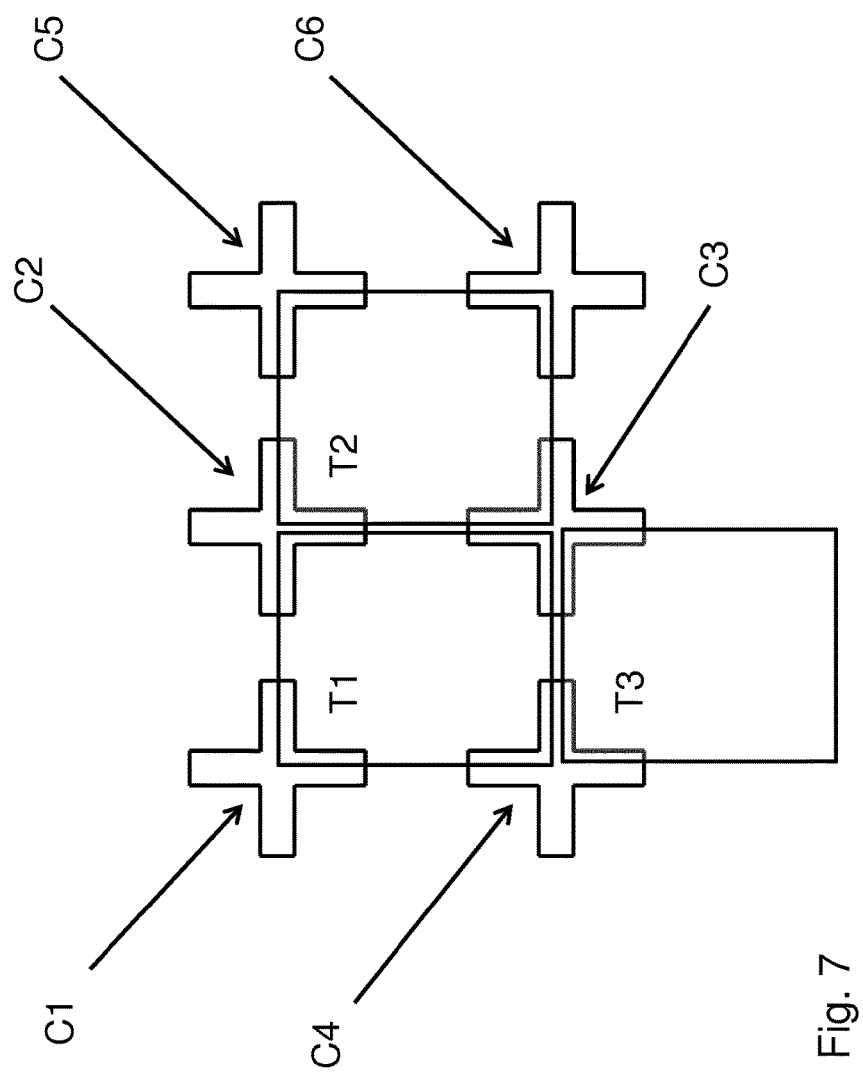
Figure 8:
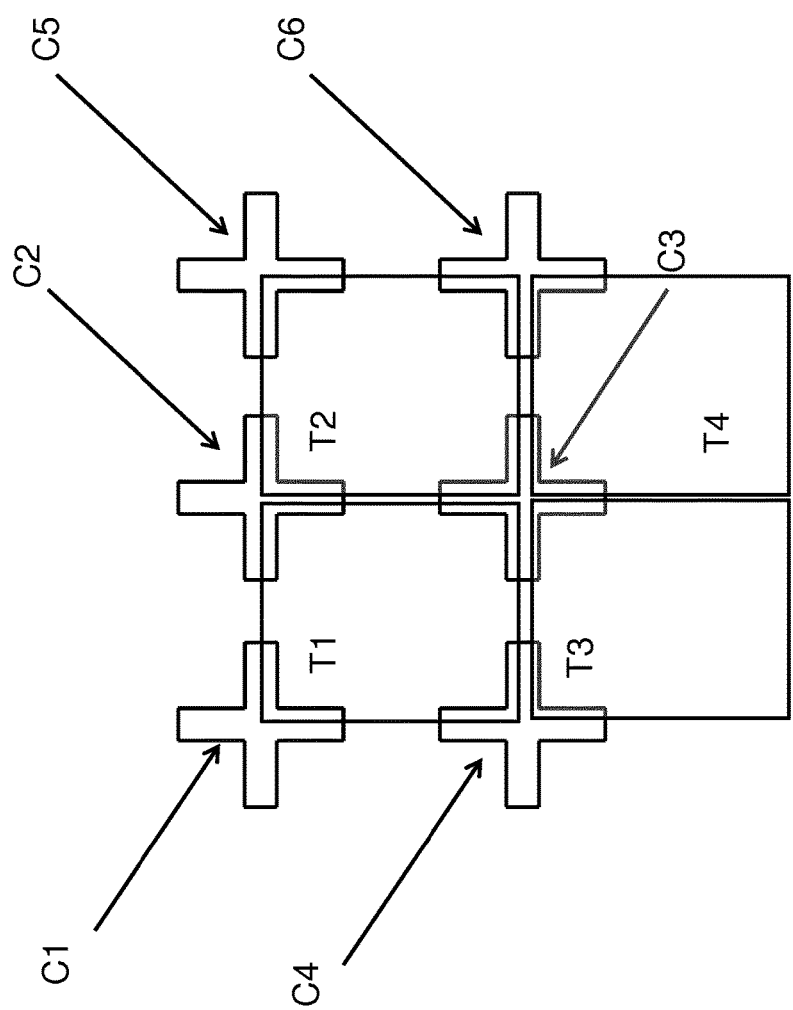
Figure 9:
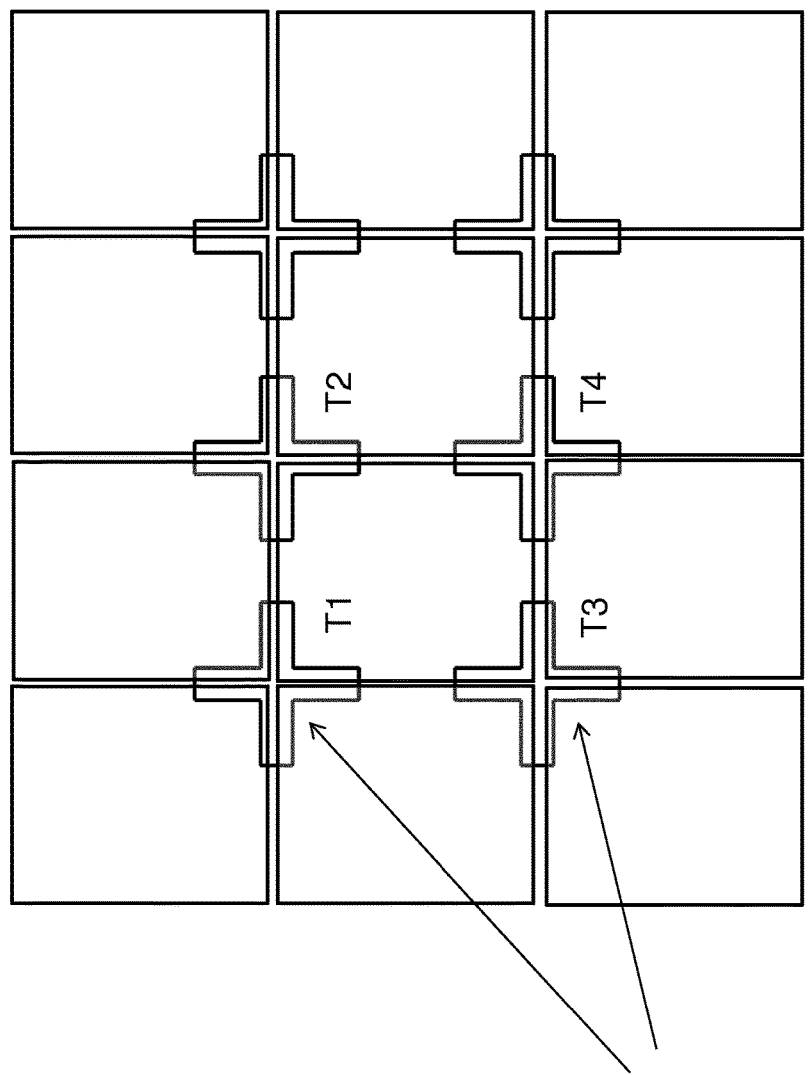

Assembly of the tiled display proceeds as seen on FIG. 7 by placing a third tile T3 next to the first and second tiles T1 and T2. As was previously the case with the tile T2, once at least two positioning pins of the tile T3 are engaged in the two corresponding openings of the positioning devices such as the crosses C3 and C4, the tiles T1, T2, T3 and the cross C3 will behave in a first approximation as a solid body for movements in the plane of the tiled display. This means that in a first approximation, the position and orientation of the tiles with respect to each other will remain unchanged when they are subject to displacements in the tile of the tiled display (said displacements being limited in amplitude by the rubber fasteners). A fourth tile T4 is positioned as seen on FIG. 8 and tiles are added until a tiled display with 3×4 tiles have been aligned and fastened to the support structure as seen on FIG. 9.

In an alternative embodiment, the positioning device such as the cross is used without being fastened to the support structure. In that case, the one or more positioning devices such as the crosses with which the tile T1 will be used are joined to the tile T1 prior to T1 being positioned on the tiled display. In the example of cylindrical positioning openings and cylindrical positioning pins described above, keeping the difference in diameter small enough will guarantee that the crosses and the tile will remain joined during the manipulation of the tile T1. A diameter difference of one hundredth mm is a good compromise between (a) ease to engage the positioning pin in its positioning opening and (b) sufficient resistance to the disengagement of the positioning pin from the positioning opening. Once the tile T1 is in position, T1 is fastened. Additional positioning devices such as the crosses are added at the same time that additional tiles are positioned and aligned with the tiles already fastened to the support structure.

The shape of the positioning devices mentioned above in any of the embodiments is not limited to that of a cross. Other shapes are possible in function of the geometry of the support structure and the cross section of the tiles.

The support structure can be made of a plate or in the form of struts joined together by welding, riveting, nuts and bolts or other fixing means so that the structure is planar and has less weight while being strong and rigid. To obtain accurate position of the holes in the support structure, the structure can be placed on a X-Y table of an NC controlled machine and the holes drilled accurately, While the invention has been described hereinabove with reference to specific embodiments, this is only done to illustrate and not to limit the invention, the scope of which shall be determined in accordance with the accompanying claims.

The invention claimed is:

1. An arrangement of two or more adjacent display tiles comprising:
   a positioning device fixing the relative position of the two or more adjacent display tiles and configured to be used with a support structure,
   the positioning device having first connection elements, the first connection elements each comprising a first positioning pin and a first positioning opening, the first positioning pin when in position linking a display tile to the positioning device, wherein the first positioning pin is fastened to the tile, the first positioning pin engaging in the first positioning opening in the positioning device, and the positioning device having a plurality of radiating arms, wherein each of said radiating arms has one end connected to a center of the positioning device and a second end that is a free end, wherein each of the radiating arms is connectable to two of the two or more adjacent display tiles and wherein the radiating arms diverge away from each other, and
   a fastener for fastening the positioning device to the support structure, wherein the fastener is configured to accommodate displacements of the tiles in the plane of the arrangement, and wherein the fastener comprises an elastic material and wherein the fastener is forced in an opening in the positioning device and in an opening in the support structure.

2. The arrangement according to claim 1, wherein each display tile is rectangular in shape and the positioning device is located at a corner of each of the two or more display tiles.

3. The arrangement according to claim 1, wherein a display tile of the two or more adjacent display tiles is linked to the positioning device by the first connection element and at least a second connection element comprising a second positioning pin that engages a second positioning opening in the positioning device.

4. The arrangement according to claim 1, wherein the support structure is a planar support structure, and the positioning device being fastened to the planar support structure.

5. The arrangement according to claim 4, wherein the positioning device is located in a plane which is located between a plane of the planar support structure and a plane of the two or more adjacent display tiles.

6. The arrangement according to claim 1, wherein once linked, the positioning device and the at least two tiles behave as a solid body.

7. The arrangement according to claim 6, wherein the positioning device is adapted so that when manipulated to assemble the tiles, the positioning device can deform elastically.

8. The arrangement according to claim 1, wherein the fastener comprises second connection elements configured to link the positioning device to the support structure of a tiled display, the second connection elements each being part of a second hole and pin combination, the pins of the second hole and pin combination comprising an elastically resilient material.

9. The arrangement according to claim 8, wherein the second pin and hole combination allows lateral elastic play movements of the two or more display tiles.

10. The arrangement according to claim 1, wherein the positioning device is shaped as a cross, and wherein the plurality of radiating arms comprise at least four radiating arms.

11. A method of installing a tiled display having two or more display tiles and linking the two or more display tiles to a planar support structure with a positioning device with first and second connection elements, wherein the first connection element comprises a first positioning pin, and the second connection elements comprise pins comprising an elastically resilient material, the method comprising:
   fixing the relative position of the two or more adjacent display tiles with a positioning device, wherein the positioning device has a plurality of radiating arms, wherein each of said radiating arms has one end connected to a center of the positioning device and a second end that is a free end, wherein each of the radiating arms is connectable to two of the two or more adjacent display tiles and wherein the radiating arms diverge away from each other, linking a display tile to the positioning device with the first positioning pin through one of the radiating arms, fastening the positioning device to the support structure by forcing one of the pins of the second connection element into an opening in the positioning device and in an opening in the support structure, the fastening of the positioning device to the support structure accommodating displacements of the tiles in the plane of the arrangement.

12. A positioning and alignment device for fixing the relative position of two or more adjacent display tiles, the positioning and alignment device comprising:

first connection elements comprising a first positioning pin and a first positioning opening, the first positioning pin when in position linking a display tile to the positioning device, wherein the first positioning pin is able to be engaged in the first positioning opening in the positioning device, and second connection elements comprising second positioning pins and second positioning openings, wherein the second positioning pins comprise an elastically resilient material, wherein the second positioning pins are able to be engaged in the second positioning openings, wherein the positioning device has a plurality of radiating arms, wherein each of said radiating arms has one end connected to a center of the positioning device and a second end that is a free end, wherein each of the radiating arms is connectable to two of the two or more adjacent display tiles using the first connection element and the second connection element and wherein the radiating arms diverge away from each other, and a fastener for fastening the positioning device to a support structure, the fastener being adapted to accommodate displacements of the display tiles in the plane of the arrangement, wherein the fastener comprises an elastic material and the fastener is adapted to be forced in an opening in the positioning device and in an opening in the support structure.

13. An arrangement of two or more adjacent display tiles comprising:

a positioning device fixing the relative position of the two or more adjacent display tiles, the positioning device having first connection elements, the first connection elements a first positioning pin and a first positioning opening, the first positioning pin when in position linking a display tile to the positioning device, wherein the first positioning pin is fastened to the tile, the first positioning pin engaging in the first positioning opening in the positioning device, the positioning device having a plurality of radiating arms, wherein each of said radiating arms has one end connected to a center of the positioning device and a second end that is a free end, wherein each of the radiating arms is connectable to two of the two or more adjacent display tiles and wherein the radiating arms diverge away from each other, a planar support structure, the positioning device being fastened to the planar support structure, and a fastener for fastening the positioning device to the planar support structure, the fastener being adapted to accommodate displacements of the two or more adjacent display tiles in the plane of the arrangement, and wherein the fastener comprises an elastic material and the fastener is forced in an opening in the positioning device and in an opening in the support structure.

14. The arrangement according to claim 13, wherein two diametrically opposed arms each have a hole of the second pin and hole combination.

15. The arrangement according to claim 14, wherein each display tile is rectangular in shape and the positioning device is located at a corner of each of the two or more display tiles.

16. The arrangement according to claim 13, wherein arms of the positioning device have a hole of the first pin and hole combination.

17. The arrangement according to claim 13 further comprising second connection elements, the second connection elements each being part of a second hole and pin combination, the pins of the second hole and pin combination comprising an elastically resilient material.

18. The arrangement according to claim 13, wherein the second pin and hole combination allows lateral elastic play movements of the two or more display tiles.

19. The arrangement according to claim 13, wherein the positioning device is located in a plane which is located between a plane of the planar support structure and a plane of the two or more adjacent display tiles.

* * * * *